July 6, 1948.                     J. BURNHAM                     2,444,725
                              ELECTROLYTIC CONDENSER
                                Filed Aug. 9, 1944
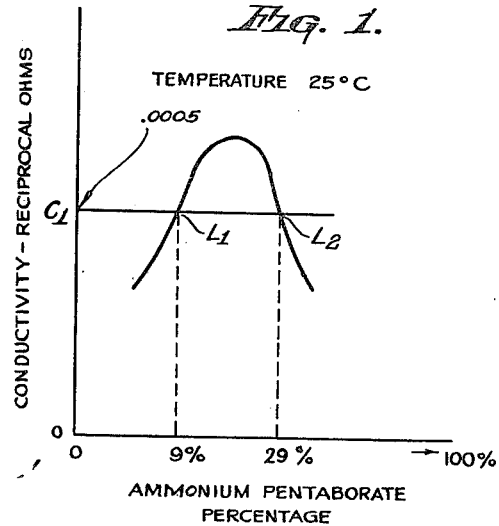
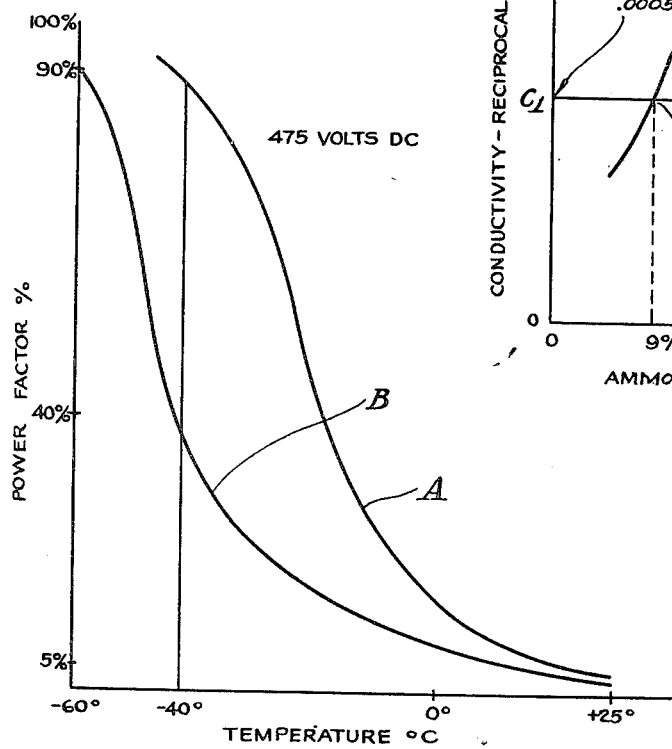
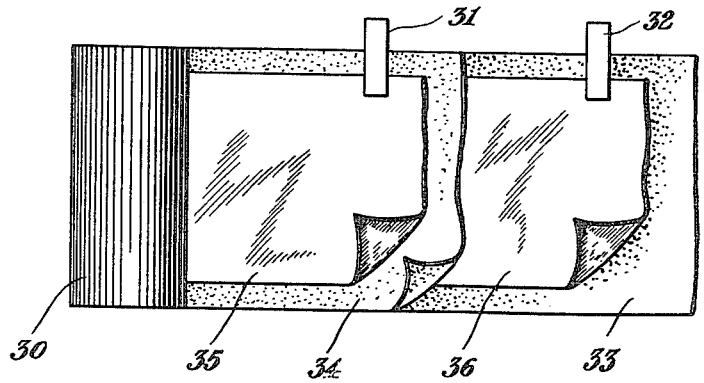
JOHN BURNHAM
INVENTOR.
BY Arthur␣G.␣Connolly
ATTORNEY Patented July 6, 1948

2,444,725

UNITED STATES PATENT OFFICE 2,444,725

ELECTROLYTIC CONDENSER

John Burnham, Williamstown, Mass., assignor to Sprague Electric Company, North Adams, Mass., a corporation of Massachusetts Application August 9, 1944, Serial No. 548,705

16 Claims. (Cl. 175—315)

This invention relates to novel electrolytic condensers, and more particularly refers to a new type of low temperature electrolytic condenser.

Electrolytic condensers are widely used because of their relatively high capacity per unit volume and their relatively low cost. Dry electrolytic condensers, which employ a very viscous electrolyte, are the most satisfactory, since the condenser may be sealed completely, without provision for venting means and without danger of electrolyte leakage.

Many different types of electrolytes are used in dry electrolytic condensers with varying degrees of success. Most of the electrolytes contain glycerine, which is reacted with the other constituent to produce a viscous, conducting electrolyte. Acetic acid, boric acid, ammonium borate, phosphoric acids, acetates, phosphates and similar compounds are generally used as components of the electrolyte, after reaction with glycerine or other polyhydroxy alcohols. The electrolyte is ordinarily prepared, for example, by dissolving a borate in glycerine at a temperature of about 130° C. and boiling the resulting solution for a short time. This treatment causes a reaction between the borate and the glycerine, i. e., to form a glyceryl borate. Such an electrolyte is described in U. S. Patent No. 1,815,768.

The resistance of the electrolyte is usually selected within the limits of about 3000 ohms/cm.$^3$ to about 6000 ohms/cm.$^3$ at room temperature. The viscosity selected is somewhat greater than that of water, for example a specific viscosity of 3 in relation to a unitary value for water. The electrolyte must not be overly viscous at the temperature of condenser impregnation, since the cloth, porous paper or other spacing material will not then be completely impregnated and the characteristics of the condenser will then be impaired.

One drawback of electrolytic condensers is their power factor or electrical loss. This power factor governs both the efficiency and the life of the condenser, since a large power factor causes undue heating, resulting in deterioration of both the electrolyte and the electrodes. The power factor in prior art condensers becomes, at temperatures much below 0° C., too large to permit their satisfactory commercial use in filter circuits, because the impedance is greatly increased. At −40° C., the usual dry electrolytic condenser exhibits a power factor in the neighborhood of 90%—obviously too large for practical application of the condenser without increasing its size excessively. Hence more expensive and bulkier rolled paper or mica condensers must be used at these low temperatures.

It is an object of this invention to overcome the foregoing disadvantages and others which directly or indirectly result therefrom. It is a further object to produce an improved low temperature electrolytic condenser. A still further object is to produce an electrolytic condenser which possesses a power factor under 50% at temperatures as low as −40° C. Still another object is to produce an electrolytic condenser whose electrolyte contains substantially no free or uncombined water. A still further object is to produce an electrolytic condenser utilizing an electrolyte composed of a solution of ammonium pentaborate in a polyhydric alcohol. Another object is to produce a low temperature electrolytic condenser which possesses a low power factor and a long life. Additional objects will become apparent from a consideration of the following description and claims.

These objects are attained according to the present invention wherein an electrolytic condenser is prepared with an electrolyte comprising a solution of ammonium pentaborate in a polyhydric alcohol. In a more restricted sense, this invention is concerned with an electrolytic condenser, the electrolyte of which comprises a substantially unreacted solution of ammonium pentaborate dissolved in glycerine. In a still more restricted sense the invention is concerned with a condenser comprising oxide-filmed electrodes and an electrolyte comprising about 9% to about 29% of ammonium pentaborate dissolved in glycerine, and having a resistance of less than 2000 ohms/cm.$^3$ at 25° C. and less than 100,000 ohms/cm.$^3$ at −40° C. The invention is also concerned with methods of producing such an electrolyte and selecting the ingredients therefor and the proportions thereof.

According to this invention, it is possible to produce a unique low temperature electrolytic condenser employing therein an electrolyte comprising a substantially unreacted solution of ammonium pentaborate dissolved in glycerine. Heretofore, electrolytes have been prepared by boiling an ammonium borate in glycerol, or by running ammonia into a boric acid-glycerol mixture, with or without the addition of water to provide the desired viscosity. All of these methods resulted in a chemical reaction between the ingredients of the electrolyte. In contrast therewith, the electrolyte of the present invention is made by dissolving ammonium pentaborate in glycerine or other polyhydric alcohol at a temperature and for a time which leaves the chemical structure of the constituents substantially unchanged. In other words, the ammonium pentaborate retains its combined water and, as such, dissolves in the glycerine or other polyhydric alcohol but does not react therewith.

Polyhydric alcohols other than glycerine, as well as mixtures of such alcohols, may be used with excellent results. However, the desirable objectives of this invention cannot be obtained by using ammonium borate compounds other than ammonium pentaborate, nor by adding water to ammonium borate and glycerine. Just why the ammonium pentaborate electrolytes of this invention should exhibit such unusual properties is not fully known, but they represent a pronounced technical and commercial improvement over the various boric acid or borate electrolytes of the prior art.

The substantial absence of free or uncombined water in the electrolyte also results in a longer life for the condenser, since corrosion of the electrodes is practically eliminated. Further, hot spots do not develop within the condenser unit to cause gas evolution, with its well known disadvantages.

An additional advantage of the present invention resides in the fact that the ingredients of the electrolyte are cheap and readily available.

To further describe the preferred embodiments of the invention, reference is made to the attached drawings in which Figure 1 represents the conductivity curve of an ammonium pentaborate-glycerol binary solution;

Figure 2 represents the curves of power factor versus temperature in a prior art condenser (curve A) and a condenser of the present invention (curve B); and Figure 3 illustrates an electrolytic condenser as described herein.

Referring now more specifically to Figure 1, a conductivity curve for an ammonium pentaborate-glycerol solution is shown. A line is drawn across the curve at $C_1$ where the conductivity is a value at which the resistance is 2000 ohms/cm.$^3$ or, transformed, .0005 reciprocal ohm. At the intersections of this value with the curve, $L_1$ and $L_2$, lines are drawn to the composition axis. It is within these limits of about 9% and about 29% of ammonium pentaborate that the solution should advisably be prepared.

The electrolyte may be prepared, for example, by heating 81 parts of glycerol to about 85° C. and adding thereto 19 parts of ammonium pentaborate in small amounts, while agitating the solvent and maintaining the temperature until the complete solution is obtained, whereupon the solution is cooled. The specific viscosity at 85° C. is generally below 3.

An electrolytic condenser is then prepared by etching and oxidizing aluminum foil in the usual manner, winding these "formed" foils convolutely with a porous paper, glass or cloth spacer, then impregnating the spacer at about 85° C. with the electrolytic solution described above.

For comparative purposes, a condenser was prepared following exactly the same procedure, but impregnating the rolled condenser with an electrolyte prepared by heating until the boiling point is 130° C., and holding at this temperature for five minutes while a chemical reaction of the components takes place with water splitting off. In this case, the components were 81 parts of glycerol and 19 parts of ammonium pentaborate, the same as the electrolyte components disclosed above in connection with the electrolyte of the invention, but the electrolyte was prepared in the usual manner.

In the examples listed below, one formed electrode and one unformed electrode were employed to make a D. C. condenser.

Figure 2 shows the power factor versus temperature curves for the two 475 volt D. C. condensers described above. Curve A represents the condensers made with the aforesaid electrolyte, produced in the usual manner, and curve B represents the condenser made in accordance with the present invention. At room temperature (20–25° C.) the power factor of condenser A is about 5% and that of condenser B is about 3%, a satisfactory figure for both. However, as the temperature decreases, the power factor of condenser A increases rapidly, while the power factor of condenser B increases at a much lower rate. At −40° C., a temperature often met in high altitude operation, such as in airplanes, the power factor of condenser A is about 90% while the power factor of condenser B is less than 40%.

This illustrates the outstanding superiority of the low temperature electrolytic condenser of the present invention over those of the prior art. The resistance of the electrolyte of this invention increases with reducing temperatures at a rate sufficiently low to permit reasonably efficient and fully satisfactory operation at sub-zero temperatures. The specific resistivity of the example of the electrolyte of the invention at 85° C. was 150 ohms/cm.$^3$, while the electrolyte prepared in the usual way was 250 ohms/cm.$^3$ at 85° C., the measurements being taken following the preparation of the electrolytes.

While suitable limits for the ammonium pentaborate concentration in glycerol have been given, i. e. from about 9% to about 29%, the preferred range is from about 13% to about 19%, where the conductivity is the highest. If other polyhydric alcohols, for example, ethylene glycol, propylene glycol, diethylene glycol, etc., or mixtures thereof are employed, new conductivity curves may readily be drawn for the alcohol or alcohols in question and the optimum amounts thereof selected in accordance with the preceding instructions hereof.

Figure 3 represents a partially unwound electrolytic condenser impregnated with the electrolyte of this invention. In this figure, 30 shows the condenser as it appears wound. 35 and 36 are aluminum electrodes which have oxide films on their surfaces as the dielectric medium. The electrodes are provided with terminal tabs 31 and 32, respectively. 33 and 34 represent porous paper spacers impregnated with the electrolyte. The thickness of the porous spacers, and the numbers of the layers thereof, is chosen in the usual manner.

A suitable electrode foil for a 400 volt condenser may be produced by etching a 3 mil high purity aluminum foil an average depth of about .4 mil, then forming the etched foil in a boric acid bath at 450 volts, until a crystalline oxide film of about .45 micron thickness is obtained. The so-formed foil may be used in conjunction with the electrolyte of the invention to produce a highly satisfactory condenser for operation at 400 volts.

In general, however, the usual types of oxide film may be used with success. For example, for low voltage condensers, oxalic acid formed films may be employed. Other electrolytes, such as phosphoric acid, chromic acid, sulphuric acid and the various salts of these acids may be used for the filming process.

In one particular application, the electrolytes of the invention have been found extremely suitable. This application is for high voltage condensers, such as 800 volts. The electrode may be etched to an average depth of about .3 mil to increase the capacity per unit area of the condenser. The etched or, in some cases, plain foil is then formed in an oxalic acid bath at 50 volts for a sufficient length of time to form a porous oxide film about 1.0 micron thick. The formed electrode is then subjected to a second film formation, this time in boric acid, where the formation is continued until a dense, crystalline oxide film is formed on the aluminum about 0.8 micron in thickness, corresponding to a forming voltage of approximately 800 volts. This thin crystalline film is located between the aluminum electrode surface and the porous oxide film. The so-formed electrode may be used with excellent results in conjunction with the electrolyte of the invention at operating voltages of 800 volts over extended periods of time.

The particular advantage of such a high voltage condenser is that it represents the first commercially practical condenser which can be successfully produced with a low-temperature, low resistance electrolyte. The oxalic acid formed film ordinarily will withstand voltages on the order of 50 volts, but with the combination of a boric acid formed crystalline film thereunder and the electrolyte disclosed herein, may be used in high voltage operation.

However, it is to be understood that the invention is not limited to the particular high voltage electrode formation described above. Other materials and means may be used to accomplish the same or similar result. The substantially porous, low voltage film may be formed from chromic, sulfuric and phosphoric acids and their various salts. The crystalline dense oxide film formed from boric acid may likewise be formed from citric and tartaric acids, and their various salts.

While condensers employing the electrolytes of the invention are particularly valuable for low temperature operation, the power factor at 25° C. is less than 5% and generally from 3 to 4%. This low power factor is, of course, extremely desirable and permits the use of the condensers at the moderate temperatures usually associated with electrolytic condensers.

It is well known that the impedance characteristics of a condenser are very important in the design of circuits employing electrolytic condensers, for filtering, by-passing, etc. In the usual electrolytic condenser, the capacity will drop and the power factor or leakage will increase with temperature decreases. The combination of greater equivalent series resistance and decreased capacity results in a greatly increased impedance, which is quite undesirable. With the condensers of this invention, it has been found that not only is the equivalent series resistance lower, but the capacity higher at low temperatures, compared to the usual electrolytic condensers. The impedance value of the condensers of the invention increases, to be sure, with decreasing temperatures, but the degree of this increase is markedly lower than in prior condensers.

As many apparently widely different embodiments of this invention may be made without departing from the spirit and scope hereof, it is to be understood that the invention is not limited to the specific embodiments hereof except as defined in the appended claims.

What I claim is:

1. An electrolytic condenser wherein the electrolyte is a substantially unreacted solution of ammonium pentaborate dissolved in a polyhydric alcohol.

2. An electrolytic condenser wherein the electrolyte is a substantially unreacted solution of ammonium pentaborate dissolved in glycerine.

3. An electrolytic condenser wherein the electrolyte is ammonium pentaborate, containing substantially all its combined water, dissolved in glycerine and having a specific viscosity less than 3 at 85° C.

4. A low temperature electrolytic condenser comprising a formed electrode and an electrolyte comprising a substantially unreacted solution of from 9% to 29% ammonium pentaborate, dissolved in glycerine.

5. A low temperature electrolytic condenser comprising at least one film-formed electrode and an electrolyte comprising a substantially unreacted solution of ammonium pentaborate dissolved in glycerine, said electrolyte having a resistivity of not more than 200° ohms/cm.$^3$ at 25° C. and 100,000 ohms/cm.$^3$ at —40° C., and said condenser having a power factor of not more than 50% at —40° C.

6. A low temperature electrolytic condenser comprising at least one film-formed electrode and an electrolyte comprising a substantially unreacted solution of from 13% to 19% ammonium pentaborate dissolved in glycerine, said electrolyte containing substantially no uncombined water and having a resistivity of not more than 2000 ohms/cm.$^3$ at 25° C., and said condenser having a power factor of not more than 50% at —40° C. and about 4% at 25° C.

7. An electrolyte for electrolytic condensers comprising a polyhydric alcohol solution of unreacted ammonium pentaborate.

8. An electrolyte for electrolytic condensers comprising a glycerine solution of unreacted ammonium pentaborate.

9. An electrolyte for electrolytic condensers comprising a glycerine solution of unreacted ammonium pentaborate having a specific viscosity less than 3 at 85° C., and wherein said ammonium pentaborate contains substantially all its combined water.

10. An electrolyte for electrolytic condensers comprising a glycerine solution of unreacted ammonium pentaborate, said solution containing from 9% to 29% ammonium pentaborate.

11. An electrolyte for electrolytic condensers comprising a glycerine solution of unreacted ammonium pentaborate, said electrolyte having a resistivity of not more than 2,000 ohms/cm.$^3$ at 25° C. and 100,000 ohms/cm.$^3$ at —40° C.

12. An electrolyte for electrolytic condensers comprising a glycerine solution of unreacted ammonium pentaborate, said electrolyte having a resistivity of not more than 2,000 ohms/cm.$^3$ at 25° C. and 100,000 ohms/cm.$^3$ at —40° C. and being substantially free of uncombined water.

13. An electrolytic condenser wherein the electrolyte is a substantially unreacted solution of ammonium pentaborate dissolved in ethylene glycol.

14. An electrolytic condenser wherein the electrolyte is a substantially unreacted solution of ammonium pentaborate dissolved in propylene glycol.

15. An electrolyte for electrolytic condensers comprising an ethylene glycol solution of unreacted ammonium pentaborate.

16. An electrolyte for electrolytic condensers comprising a propylene glycol solution of unreacted ammonium pentaborate.

JOHN BURNHAM.

REFERENCES CITED

The following references are of record in the file of this patent:

UNITED STATES PATENTS

| Number | Name | Date |
| --- | --- | --- |
| Re. 19,604 | Edenburg | June 11, 1935 |
| 1,815,768 | Georgiev | July 21, 1931 |
| 2,031,128 | Raines | Feb. 18, 1936 |
| 2,062,543 | Waterman | Dec. 1, 1936 |
| 2,116,449 | Robinson | May 3, 1938 |
| 2,196,057 | Clark | Apr. 2, 1940 |
| 2,255,817 | Ruben | Sept. 16, 1941 |

FOREIGN PATENTS

| Number | Country | Date |
| --- | --- | --- |
| 397,538 | Great Britain | Aug. 21, 1933 |